United States Patent Office 3,457,239
Patented July 22, 1969

3,457,239
PROCESS OF PREPARING POLYETHYLENE TEREPHTHALATE USING LEAD FLUORIDE AS TRANSESTERIFICATION CATALYST AND AS CONDENSATION CATALYST
Mary J. Stewart, Riddlewood, Media, and John A. Price, Swarthmore, Pa., assignors to FMC Corporation, Philadelphia, Pa., a corporation of Delaware
No Drawing. Filed Jan. 20, 1967, Ser. No. 610,498
Int. Cl. C08g 17/015, 17/08
U.S. Cl. 260—75                                    2 Claims

ABSTRACT OF THE DISCLOSURE

Process of preparing polyethylene terephthalate comprising carrying out both a transesterification reaction between ethylene glycol and dimethyl terephthalate and polycondensing the resulting transesterified product in the presence of a catalytic amount of lead fluoride as the sole catalytic agent.

---

This invention relates to a method of preparing polyester resin. More particularly, it relates to a method for preparing polyethylene terephthlate resin suitable for melt spinning into filaments, through the use of a compound which is effective as both a transesterification and polycondensation catalyst.

It is known that filament-forming polyesters can be made from a dialkyl terephthlate and a diol, such as dimethyl terephthlate and ethylene glycol, respectively, by first combining such ingredients and subjecting them to an ester-interchange or transesterification reaction in the presence of a transesterification catalyst at elevated temperature and atmospheric pressure to form a polyester prepolymer which may be described as being comprised principally of bis(2-hydroxyethyl)terephthalate. The polyester prepolymer is then polycondensed at higher temperatures and under reduced pressure in the presence of a polycondensation catalyst to form the filament-forming polyester resin.

Heretofore, various materials have been suggested as catalysts for use in the ester-interchange method of preparing polyethylene terephthlate. In most instance, a combination of catalysts comprising a transesterification catalyst and a polycondensation catalyst, has been used. Obviously, for purposes of simplicity, it would be advantageous to be able to use one compound as the single catalyst for both the transesterfication and polycondensation steps in the ester-interchange method for preparing polyethylene terephthlate. A large number of the catalyts suggested in the prior art are not entirely satisfactory because in many instances, they do not act to form polyester resins having carboxyl content values sufficiently low or molecular weights and melting points as high as required for filament-forming purposes.

In general, polyethylene terephthalate resin suitable for melt spinning into filaments should have a carboxyl content value of below about 50 equivalents per million grams (eq./$10^6$ gr. or meq./kg.), a melting point of about 258–260° C. and an intrinsic viscosity not less than about 0.60 (as determined in a 60% phenol and 40% tetrachloroethane solution, wt./wt., at 30° C.) in order for the filaments formed therefrom to possess a satisfactory level of hydrolytic stability, and thermal stability which is necessary for the use of such filaments in the manufacture of wash and wear clothing.

It is an object of this invention to prepare polyester resin suitable for melt extrusion into processable filaments through the use of a transesterification and polycondensation process.

It is another object of the present invention to provide an improved method for accelerating both the transesterification reaction between ethylene glycol and dimethyl terephthalate and the polycondensation reaction of the resulting transesterified product or prepolymer in the presence of a single catalyst into a polyethylene terephalate resin suitable for preparing filaments therefrom.

These and other objects are accomplished in accordance with the present invention which involves a method for preparing polyethylene terephthlate wherein dimethyl terephthalate and ethylene glycol are transesterified and the resulting transesterified product is polycondensed, the improvement comprising carrying out both the transesterification reaction and the polycondensation reaction in the presence of a catalytic amount of lead fluoride as the sole catalyst.

In general, the preparation of filament-forming polyesters of the present invention via the ester-interchange reaction is carried out with a molar ratio of ethylene glycol to dimethyl terephthlate of from about 1:1 to about 15:1, but preferably from about 1.2:1 to about 2.6:1. The ester-intechange reaction is generally carried out at atmospheric pressure in an inert atmosphere, such as nitrogen, initially at a temperature range of from about 125° C. to about 250° C. but preferably between about 150° C. and 200° C., in the presence of an ester-interchange catalyst. During this first stage, methyl alcohol is evolved and is continuously removed by distillation. After a reaction period of about two hours, the temperture of the reaction mixture is raised from about 200° C. to about 300° C. over about a one hour period in order to complete the reaction and distill off excess glycol which has been produced and induce polycondensation. The main and desired product of the ester-interchange reaction is the prepolymer comprised priniciplally of bis(2-hydroxyethyl) terephthalate. The second stage of polycondensation step of the present method is generally achieved under reduced pressure within the range of from about 0.05 mm. to 20 mm. of mercury at a temperature of from about 260° C. to about 325° C. for about 3–5 hours. It is preferable to carry out both the first and second stage of the present method under agitation.

Generally, concentrations of lead fluoride in the range of from about 0.01% to about 0.20%, based on the weight of the dimethyl terephthalate in the subject dimethyl terephthalate-ethylene glycol reaction mixture is used as the sole catalyst of the present invention. Higher or lower concentrations of the present catalyst may also be used. However, when concentrations less than the above are used, their catalytic effect is generally reduced, whereas if greater concentrations than these are used, no further improvements in the present method or desired product is obtained. Usually, it has been found that from about 0.02% to about 0.10% of the present lead fluoride, based on the weight of the dimethyl terephthalate in the original dimethyl terephthalate-ethylene glycol reaction mixure is preferred to produce the linear polyester resins of the present method.

The following examples of a preferred embodiment will further serve to illustrate the present invention. All parts are by weight unless otherwise indicated.

EXAMPLE

A mixture comprising 600 grams of dimethyl terephthalate, 396 mls. of ethylene glycol and 0.24 gram of lead fluoride ($PbF_2$) was charged into a reaction vessel equipped with a nitrogen inlet, a distillation arm, heating means, and a stirring means. The reaction mixture was agitated and heated at atmospheric pressure to about 197° C. over a period of about 30 minutes under a nitrogen blanket whereby byproduct methyl alcohol was distilled off. The reaction mixture was held at about 197° C. for about two hours. Then, the temperature of the reaction mixture was allowed to rise in order to distill off any remaining byproduct comprising methyl alcohol and ethylene glycol, and form the desired polyester prepolymer product. After about 30 minutes, the temperature had risen to 230° C. at which time the prepolymer product was cooled under a nitrogen blanket.

Fifty grams of the above prepolymer was charged into a reaction vessel (without additional catalyst) equipped with a nitrogen inlet, a vacuum source, a distilling arm, stirring means, and heating means. The pressure within the reaction vessel was reduced to from about 0.1 to about 0.05 mm. of mercury at 285° C. under a nitrogen blanket and the reaction mixture was agitated under these conditions for about three hours to bring about the polycondensation of the prepolymer and formation of the polyester resin.

The resulting polyester resin had an intrinsic viscosity of 0.71 (determined in a 60% phenol and 40% tetrachloroethane solution, wt./wt., at 30° C.), a melting point of about 262° C. and a carboxyl content value of 9.8 (eq./$10^6$ gr.).

The results in the above example indicate that polyethylene terephthalate resin can be prepared by the present ester-interchange method with the use of lead fluoride as the sole catalytic agent. Through the use of the present method, a polyester resin is obtained which is characterized by physical and chemical properties which makes it particularly useful for melt spinning into filaments.

While the present invention has been generally described with respect to the preparation of polyethylene terephthalate, it is also within the scope of the present invention to prepare copolyesters containing various ratios of terephthalic acid esters with esters of other dibasic acids such as isophthalic acid with the use of glycol of the series $HO(CH_2)_nOH$ where $n$ is 2 to 10 using lead fluoride as the sole catalytic agent.

We claim:
1. In a process of preparing polyethylene terephthalate resin wherein dimethyl terphthalate and ethylene glycol are transesterified and the resulting transesterified product is polycondensed, the improvement comprising carrying out the transesterification reaction and polycondensation reaction in the presence of a catalytic amount of catalyst consisting essentially of lead fluoride as a catalyst for both of said reactions.

2. The process of claim 1 wherein the lead fluoride is present in an amount of from about 0.01 to about 0.20%, based on the weight of the dimethyl terephthalate in the reaction mixture.

References Cited

UNITED STATES PATENTS

| 2,534,028 | 12/1950 | Izard | 260—75 |
| 3,072,612 | 1/1963 | Pengilly | 260—75 |

FOREIGN PATENTS

| 1,297,516 | 5/1962 | France. |

WILLIAM H. SHORT, Primary Examiner

LOUISE P. QUAST, Assistant Examiner

U.S. Cl. X.R.

260—475